US007623955B1

(12) United States Patent
Rackmil et al.

(10) Patent No.: US 7,623,955 B1
(45) Date of Patent: Nov. 24, 2009

(54) METHOD FOR ESTIMATION OF INDICATED MEAN EFFECTIVE PRESSURE FOR INDIVIDUAL CYLINDERS FROM CRANKSHAFT ACCELERATION

(75) Inventors: Charles I. Rackmil, Ypsilanti, MI (US); Daniel L. McKay, Brighton, MI (US); Gerard W. Malaczynski, Bloomfield Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 24 days.

(21) Appl. No.: 12/150,686

(22) Filed: Apr. 30, 2008

(51) Int. Cl.
*G01M 15/05* (2006.01)

(52) U.S. Cl. ....................... 701/115; 123/435; 123/436; 73/114.17; 73/114.22

(58) Field of Classification Search ................. 701/101, 701/114–115; 73/35.03, 35.04, 35.07, 35.12; 123/435–436

See application file for complete search history.

(56) References Cited

U.S. PATENT DOCUMENTS

| | | | | |
|---|---|---|---|---|
| 5,157,965 | A | 10/1992 | Koegeler et al. | |
| 5,385,129 | A | 1/1995 | Eyberg | |
| 5,856,922 | A | 1/1999 | Jehanno | |
| 6,029,109 | A | 2/2000 | Rossignol et al. | |
| 6,112,149 | A | 8/2000 | Varady et al. | |
| 6,212,945 | B1 | 4/2001 | Moskwa | |
| 6,223,120 | B1 | 4/2001 | Williams | |
| 6,302,083 | B1 | 10/2001 | Karcher et al. | |
| 6,401,527 | B1 | 6/2002 | Langer | |
| 6,415,656 | B1 * | 7/2002 | Bidner et al. | 73/114.15 |
| 6,885,932 | B2 | 4/2005 | Liu et al. | |
| 7,321,822 | B2 | 1/2008 | Schmidt et al. | |

OTHER PUBLICATIONS

SAE Technical Paper No. 2001-01-0990, “Individual Cylinder Imep Estimation Using Crankshaft Angular Velocity Measurements,” 2001 World Congress, Detroit, Michigan; Mar. 2001.

* cited by examiner

*Primary Examiner*—Hai H Huynh
(74) *Attorney, Agent, or Firm*—Thomas N. Twomey

(57) ABSTRACT

A method for inferring Indicated Mean Effective Pressure as total transient indicated engine torque in an internal combustion engine, comprising the steps of acquiring at least one crankshaft time stamp for use in determining a cylinder-specific engine velocity; calculating an incremental change in engine kinetic energy from the previously fired cylinder ($j-1^{st}$) to the currently fired ($j^{th}$) cylinder using the cylinder-specific engine velocity; equating the incremental change in engine kinetic energy to a change in energy-averaged cylinder torque (IMEP) from the previously-fired ($j-1^{st}$) to a currently-fired ($j^{th}$) cylinder; summing a plurality of the incremental changes in engine kinetic energy over time to determine a value of the transient component of indicated torque; determining a value of the quasi-steady indicated engine torque; and adding the value of transient component of indicated torque to the value of quasi-steady indicated engine torque to yield the Indicated Mean Effective Pressure.

10 Claims, 3 Drawing Sheets

EQUATION OF MOTION FROM TORQUE BALANCE ON RIGID CRANKSHAFT $$T_{ind} - (T_L + T_F) = I_E \alpha_E \quad (1)$$

TORQUES COMPRISED OF TRANSIENT PLUS CYCLE AVERAGED VALUES $$T = T(t) + \bar{T} \quad (2)$$

10

$$\bar{T}_{ind} = \bar{T}_L + \bar{T}_F \quad (3)$$

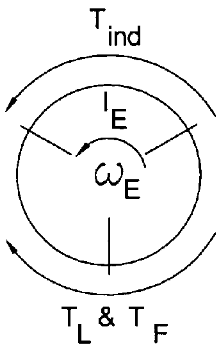

ASSUMPTIONS

- LOAD AND FRICTION TORQUE CONSTANT WITHIN EACH CYCLE
- CONSTANT ENGINE INERTIA OVER EACH CYLINDER EVENT
- CHANGE IN GAS TORQUE IMPULSE FOR EACH CYL EVENT DETERMINED FROM DELTA $\alpha_E$ $$T_{ind,j} - T_{ind,(j-1)} = I_E(\alpha_{E,J} - \alpha_{E(j-1)}) \quad (4)$$

RESULTING ESTIMATOR

- NUMERICAL DIFFERENCE FORMULA USED TO REPRESENT ENGINE ANGULAR ACCEL.
- DIFFERENCE IN GAS TORQUE VALUES FOR EACH CYLINDER EVENT, MULTIPLIED BY DELTA CRANK ANGLE, IS SUMMED OVER TIME FOR RESULTING RUNNING AVERAGE CHANGE IN KINETIC ENERGY $$\Delta K.E. = \Delta\Theta(T_{ind,j} - T_{ind,(j-1)}) =$$
$$\Delta\Theta\, I_E(d\omega_E/dt_j - d\omega_E/dt_{(j-1)})$$

FIG. 1.

METHOD FOR ESTIMATION OF INDICATED MEAN EFFECTIVE PRESSURE FOR INDIVIDUAL CYLINDERS FROM CRANKSHAFT ACCELERATION

TECHNICAL FIELD

The present invention relates to a method of estimating individual average cylinder torque values of internal combustion engines; more particularly, to methods for optimizing operating parameters such as combustion mixtures and spark timing in such engines; and most particularly, to an improved method for inferentially determining Indicated Mean Effective Pressure (IMEP) for individual cylinders by calculation from instantaneous changes in crankshaft acceleration, and to a method for engine control employing improved IMEP calculation.

BACKGROUND OF THE INVENTION

Knowledge of individual cylinder values of Indicated Mean Effective Pressure (IMEP) is known in the prior art as a powerful tool for evaluating and correcting poor combustion in an internal combustion engine. By definition, IMEP, in kiloPascals, is defined as the ratio of the indicated work in Newton meters (W) divided by the swept volume per cylinder (V) in liters:

$$IMEP = W/V \quad \text{(Equation 0)}$$

IMEP is an accepted standard method for measuring combustion in internal combustion engines. The information is valuable in indicating combustion quality and is used extensively in the prior engine arts in engine dynamometer work to characterize and quantify acceptable and unacceptable combustion performance. IMEP is known to be used to determine the limits of engine dilution (e.g., exhaust gas recirculation, camshaft phasing), spark advance angle, and rich/lean limits to engine fueling.

Although IMEP is a valuable parameter for combustion development, its use in real time engine controls has been limited in the prior art in general because its determination has required expensive and non-durable combustion analysis equipment, and because the prior art methods of measurement have been engine-intrusive (e.g., combustion pressure sensors in the engine heads or spark plugs). Other known methods of combustion quality measurement, such as Ion Sense technology, require expensive hardware upgrades and have not been generally available. Off-board rack-type analysis equipment is bulky, expensive, and non-portable. Thus, engine control using IMEP has been largely a laboratory phenomenon rather than being useful day-to-day in an operating vehicle.

Less than ideal combustion performance can arise from a variety of sources including: engine component design limitations; variations in fuel properties in the field; aged engine components; and manufacturing tolerances of engine subassemblies and components. Manufacturing tolerances for valve train intake and exhaust ports and valves; fouled plugs, ports or injectors; and/or design trade offs affecting fuel, purge, PCV and EGR distribution, can all contribute to degraded combustion quality. Contributors to degraded combustion can affect performance of individual cylinders, or of the engine as a whole.

An individual cylinder torque estimator, used in conjunction with an appropriate engine algorithm in real time control, can mitigate the sources of cylinder-to-cylinder combustion variability, ultimately improving, for example, idle quality, NVH due to torque imbalance, peak power, and cold start emissions.

Prior art methods which attempt to estimate individual cylinder torque values focus on assessing combustion performance based upon a single cycle or single-cylinder event. When attempting to evaluate combustion quality, quantifying only single-cylinder events can be misleading due to cyclic variability of fuel transients in the ports, or to unburned fuel residuals which remain after partial burns or misfires. Incomplete mixing and burn due to in-cylinder turbulence which is unrepresentative of overall combustion behavior may also result in poor combustion on a single cylinder event basis.

Using a statistical evaluation of IMEP as a metric to gauge combustion quality is therefore advantageous and superior. The Coefficient of Variance of IMEP (COVIMEP) is a statistical evaluation of combustion quality. COVIMEP is a way of characterizing engine combustion that is well accepted across the automotive industry. As such, it provides an objective and standard means for quantifying combustion performance. Because of its ready availability, correlation to other engine performance characteristics, for example, brake-specific emissions values, is also possible.

In addition to the lack of a good metric for evaluating combustion quality that can be used in real time control, prior art methods have also required additional development effort to calibrate their models. While such development effort is of value for improving the model's accuracy, it provides limited additional benefit beyond the express purpose of individual cylinder torque estimation.

Further, depending on complexity, prior art methods can be computationally expensive which limits their use, especially at high engine speeds when the chronometric impact of calculations which must be performed in the period between cylinder firing events, i.e. calculations for individual cylinder torque estimation, is greatest.

What is needed in the art is a method for providing cylinder IMEP information, and an associated control metric, that does not require additional engine hardware or significant development effort and computational expense, while at the same time providing good utility for real time engine control.

It is a principal object of the present invention to provide realtime IMEP and COVIMEP for each cylinder of a multi-cylinder engine, and the engine as a whole, from calculated crankshaft velocities and accelerations, and from a pre-existing algorithm which requires little or no additional calibration effort for the present purpose. Additionally, the present invention includes calculations which are simplified and optimized for computational efficiency and speed.

SUMMARY OF THE INVENTION

Briefly described, the current invention decouples the calculation of the transient, inter-cycle component of indicated torque from its quasi-steady, multi-cycle component. A torque balance, or conservation of kinetic energy of rotating and reciprocating engine components, is used to estimate the transient component, and a pre-existing, cycle-averaged engine indicated torque algorithm is used to calculate the quasi-steady component.

Of importance to the present discussion and method are terms in common use in the art for the tracking and timing of cylinder events within a cycle of a given multi-cylinder internal combustion engine. These terms are crankshaft time stamp, and cylinder reference event period.

A crankshaft time stamp is the time at which a specific crankshaft position is sensed on a toothed wheel attached to the crankshaft and is typically accomplished through a microprocessor connected to a variable reluctance device (VRD). The VRD senses a voltage change associated with a specific tooth passing the VRD's fixed crank angle location. As the engine rotates, the voltage change is marked in time (stamped), via the microprocessor's internal clock.

In general, the microprocessor acquires crank shaft time stamps for specific teeth located at predetermined crank angle locations. Knowing the crank angle location of the teeth, and the period of time between any two teeth (the difference in the time stamps), allows for the calculation of the average engine velocity between the teeth. These time periods typically are also corrected for tooth errors that result from manufacturing tolerances of the high data rate wheel. Tooth error correction is performed via an algorithm learning process that takes place during fuel cut-off overrun engine condition(s).

When the two teeth of interest are located equidistant in crank angle from each of two consecutive cylinders' top dead center locations, the period of time is referred to as a cylinder reference event period. The ratio of the difference in crank angle between two consecutive teeth divided by the difference in their time stamps approaches an instantaneous value of engine speed for wheels with a large number of teeth (i.e. as in a high data rate wheel), for example, 58 teeth.

As previously noted, a total indicated engine torque estimate comprises two components, transient and quasi-steady. In the present invention, the transient component of indicated torque is derived from variations in average crankshaft velocity. The quasi-steady component is determined from a quasi-steady indicated torque model.

Changes in crankshaft velocity from one cylinder to the next are equated to changes in engine kinetic energy within an engine cycle (inter-cycle). Changes in inter-cycle engine kinetic energy are attributed to changes in energy-averaged cylinder torque values. Referring to Equation 1 above, by definition, energy averaged changes in cylinder torque are equivalent to changes in cylinder IMEP value.

Conversely, changes in engine kinetic energy which occur over multiple engine cycles are accounted for through cycle averaged indicated torque as estimated by the quasi-steady model. A state-space approach is used to sum the changes in kinetic energy over time, yielding energy-average cylinder torque or IMEP values. During initialization, the quasi-steady component of cylinder indicated torque is used to "seed" the total indicated torque estimate for the first engine cycle. After initialization, the quasi-steady indicated engine torque is used to continuously re-center the total indicated engine torque values. The term "seed" is used to denote each initialization of the algorithm as described in detail below.

The quasi-steady indicated engine torque estimate represents a cycle-averaged torque value. Knowing the average torque for the first engine cycle and the estimated torque changes for each cylinder in the cycle allows for the determination (or initialization) of each cylinder's torque for the first engine cycle. In a similar way, for all subsequent engine cycles after the first, the quasi-steady indicated torque value is used to re-center the average engine torque calculated by the model by adding or subtracting a percentage of the difference between the model's estimated engine torque and the quasi-steady value.

A detailed description of the quasi-steady component of cylinder torque is provided below in an exemplary illustration of a method commonly employed in the prior art as part of an automotive engine control scheme used in the estimation of indicated engine torque. This calculation is re-used in the present invention to supplement the calculations of individual cylinder torque values. In and of itself, this quasi-steady torque estimation is in common prior art use in microprocessor-based engine control and as such does not represent anything novel; however, prior art methods which utilize a time-based approach to calculate transient torque do not avail themselves of this historically well-tested, parameterized, and accurate means for estimating the quasi-steady torque component of an individual cylinder torque model.

The present invention is useful in control of spark-ignited engines and combustion-ignited engines.

Novelties of the present invention include:

1. accurate, by-cylinder/engine IMEP, and by-cylinder/engine COVIMEP calculations using only tooth error-corrected engine speed and quasi-steady engine indicated torque algorithm to both "seed" and re-center the total cylinder torque estimate, and a commercially available engine control unit which eliminates the expense and intrusiveness of direct IMEP measurements with pressure sensors;

2. state space analytical technique which significantly reduces the level of calibration effort needed to parameterize the model. The current invention utilizes readily-available steady state engine dynamometer ("mapping") data for the determination of the quasi-steady component of cylinder torque. For the most part, the calibration parameters are reduced to physical constants of the engine and readily available steady state engine dynamometer ("mapping") data. Calibration effort expended to refine torque estimates can benefit other users of the torque data. Since this quasi-steady indicated torque estimate is generally available and in use in prior art engine controls, the present method requires no additional calibration or engine parameterization for this part of the solution;

3. coarse discretization of the instantaneous engine speeds in order to reduce the computational requirements to a level acceptable for real time processing in commercially available microcontrollers. Care must be taken in the choice of crank locations and difference equations used to ensure they are accurate enough for the intended application. Simple finite difference formulas, plus existing hardware and designs currently in use for misfire detection, are leveraged for this purpose. Unlike prior art methods requiring the acquisition of multiple crankshaft time stamps for each cylinder reference event period (refer to U.S. Pat. No. 6,029,109, which specifies the use of four such periods) plus associated calculations, the current invention requires only one time stamp per cylinder and simple numerical difference formulas to represent changes in indicated torque values;

4. use of the Coefficient of Variance (COVIMEP) metric, and COVIMEP calculations which are optimized to minimize chronometric impacts and have good utility for real time engine control; and 5. "seeding" of the indicated cylinder torque estimate and re-centering around a quasi-steady engine torque value.

BRIEF DESCRIPTION OF THE DRAWINGS

The present invention will now be described, by way of example, with reference to the accompanying drawings, in which:

FIG. 1 shows the mathematical development of a rigid crankshaft torque balance model for determining change in torque and kinetic energy as a function of the crank range over which a calculated torque change is assumed to act;

The exemplification set out herein illustrates a presently-preferred embodiment of the invention, and such exemplification is not to be construed as limiting the scope of the invention in any manner.

DESCRIPTION OF THE PREFERRED EMBODIMENTS

The transient inter-cycle indicated torque component may be determined in two ways: either indirectly, through calculation of engine kinetic energy change via the difference in average torque from one cylinder event to the next multiplied by the crank angle over which average torque difference acts, or directly, through changes in measured instantaneous crank shaft velocities from one cylinder event to the next. For illustration purposes, the development of average torque changes (indirect method) will be described in detail here.

Referring to FIG. 1, a torque balance on a rigid crankshaft of an internal combustion engine is illustrated in Diagram 10. Gas or indicated torque ($T_{ind}$) is assumed to act through the piston and connecting rod assembly at the crank/connecting rod interface. As a first approximation, an average cylinder torque is assumed to act over a crank angle range ($\omega_E$), the location of which is optimized for capturing the total energy contribution of the current ($j_{th}$) cylinder event. Engine inertia ($I_E$) is also assumed constant over the same crank angle range. The indicated engine torque is balanced with engine friction and load torques ($T_L$ and $T_F$). For purposes of calculating the transient component of indicated torque, engine friction and load are assumed constant within each engine cycle.

The resulting torque balance for the transient component of engine torque is mathematically shown in Equation (1). The difference between the indicated torque and the sum of friction and load torque is what's available to accelerate the engine ($I_E\omega_E$). As shown in Equation (2), torques are divided into transient or alternating (T(t)) and cycle averaged values ($\overline{T}$). By definition, on a cycle-averaged basis, average indicated torque ($\overline{T}_{ind}$) is equal to the average of the sum of load and friction torques (Equation (3)).

Substituting Equations (2) and (3) into Equation (1) and discretizing over the current and previous cylinder events (j and j−1) yields Equation (4). Equation (4) shows that the change in average indicated torque from the previous to current cylinder event is equal to the difference in engine acceleration multiplied by the average engine inertia. Equation (4) can be written in the form of a change in kinetic energy (ΔK.E.) by multiplying by the crank range (ΔΘ) over which the torque difference is assumed to act (Equation 5). Since the change in kinetic energy is assumed to result from gas torque above or below the cycle averaged level, from the definition of IMEP the change in kinetic energy is also represented by the difference in IMEP times cylinder displacement.

Figure 2:
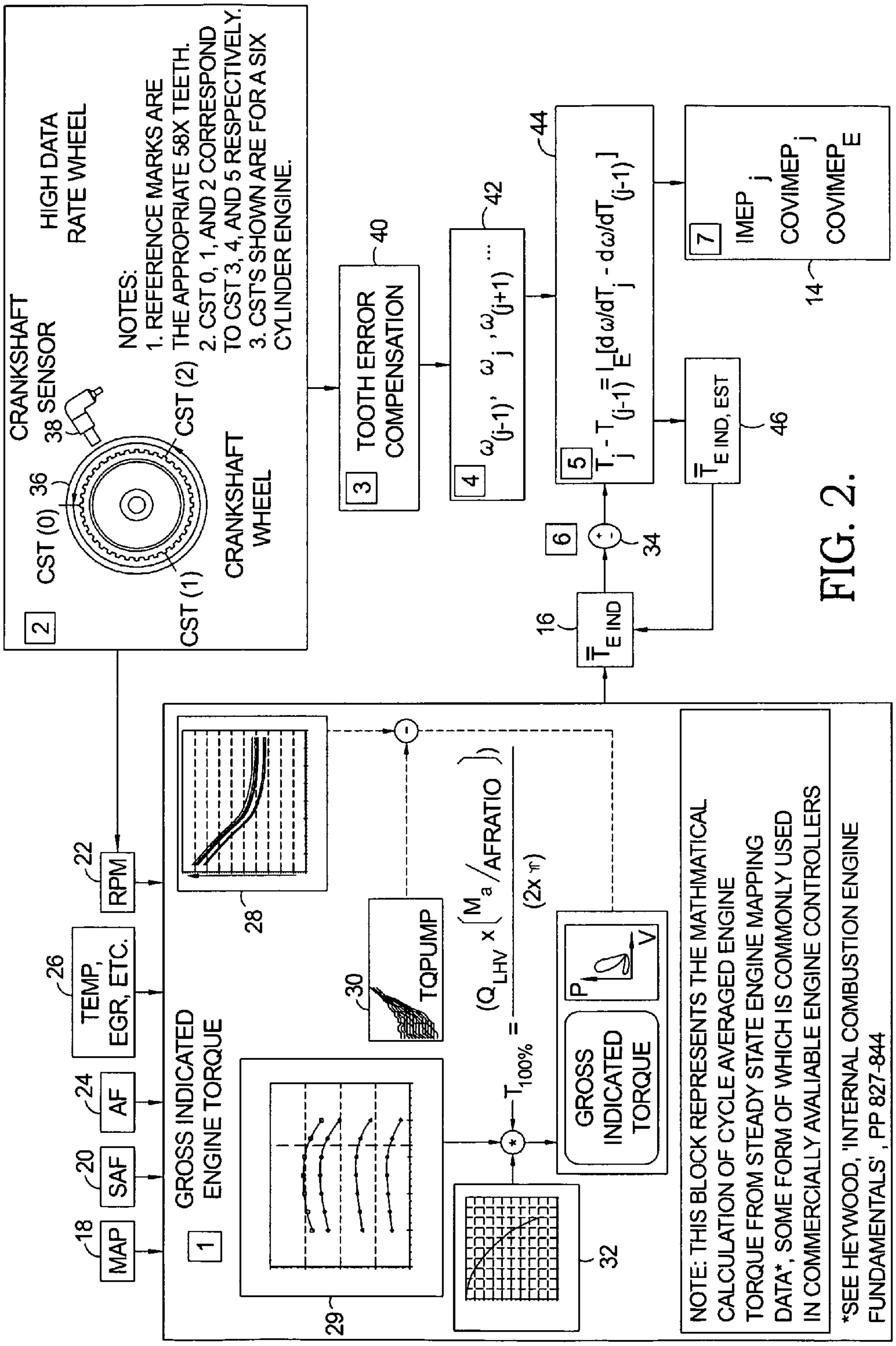
FIG. 2 is a schematic drawing of an estimator algorithm in accordance with the present invention for estimating IMEP for each cylinder, COVIMEP for each cylinder, and COVIMEP for the entire engine.

FIG. 2 graphically illustrates how the above transient indicated torque equation is embedded for use in an overall average indicated cylinder torque model 12. The various calculations performed in the current invention for estimating torque and IMEP values for each cylinder of the engine, and resulting values of coefficient of variance of each cylinder's IMEP and for the engine as a whole 14, are also schematically shown.

Quasi-steady indicated engine torque 16 is determined from measured engine air and fuel flow [1]. This is typically done using a speed density algorithm utilizing sensed manifold absolute pressure or mass air flow meter, for measuring air flow 18, plus characterizing injector flow and monitoring injector pulse width for estimating fuel flow. Engine air fuel ratio 24, is determined from the ratio of these two values. Total delivered spark advance is also monitored 20. Engine speed 22, EGR, and operating temperatures and steady state engine performance maps describing either brake or indicated engine torque 29 are also used as input to the quasi-steady engine torque model. Engine or component performance maps may also be used to describe mechanical friction 28 and pumping 30 losses as well as accessory torque requirements (not shown in the figure). It is an important advantage of the present invention that all of these data inputs are already present in modern automotive engine control; thus, no additional parameterization or apparatus is required to obtain the quasi-steady indicated engine torque estimate 16.

The quasi-steady indicated engine torque 16 is used to both "seed" and continuously re-center [6] the cylinder IMEP estimator around the current cycle averaged value 34.

Instantaneous or average values of engine speed are determined from a high data rate crankshaft target wheel 36 and variable reluctance sensor 38 in known fashion [2]. The delta time values are corrected for tooth errors 40 [3]. These tooth errors result from manufacturing tolerances of target wheel 36. Instantaneous or average engine speed values 42 are used in a numerical difference formula to estimate engine angular acceleration 42 [4]. Changes in engine angular acceleration are then used to calculate changes in engine torque (and kinetic energy) from one cylinder/ref event to the next 44 [5]. Using the seed value 16 of estimated engine torque from [1], subsequent levels of torque needed to accelerate the engine at each ref event are evaluated 46.

From cylinder IMEP levels 14, corresponding values of the Coefficient of Variance of IMEP (COVIMEP} are determined for each cylinder and for the engine as a whole. After individual cylinder torque and IMEP values are determined, a numerically optimized technique is used to evaluate COVIMEP. The present method utilizes a buffer of previously calculated cylinder IMEP values and a calculation which tracks the sum and the sum of squares of the buffer. The optimization reduces the computational requirements of calculating COVIMEP at each cylinder event through a reformulation of the coefficient of variance (COV) equation. This reformulation results in a computational savings of N−1 additions and subtractions (where "N" is the COV sample size), when compared to the traditional method of COV calculation.

A computationally efficient calculation for the Coefficient of Variance in accordance with the present invention is a follows:

The Coefficient of Variance is equal to the standard deviation (σ) over the mean ($\overline{x}$):

$$COV=\sigma/\bar{x} \qquad \text{(Equation 7)}$$

The standard deviation is equal to the square root of the sum of the square of the difference between the mean and the individual values divided by the number of samples minus one:

$$\sigma = \sqrt{\sum_{1}^{N} (\bar{x} - x_i)^2 / (N-1)} \qquad \text{(Equation 8)}$$

Expanding the series and substituting for the mean $$\left(\bar{x} = \sum_{1}^{N} x_i / N\right)$$

yields a more computationally efficient form of the equation for COV:

$$COV = \sigma / \bar{x} = \sqrt{\left(\sum_{1}^{N} x_i^2 / \bar{x}^2 - N\right) \Big/ (N-1)} \quad \text{(Equation 9)}$$

By storing the sequential individual sample values in a buffer and tracking the sum of the square and square of the average of the buffered values, the COV may be calculated in an efficient manner with no loss of accuracy. This method requires only one addition and one subtraction for each new value in the sample (adding and subtracting the newest and oldest values in the buffer, respectively, to and from their sums), compared to the prior art method of N additions and N subtractions in the traditional COV calculation. This results in a savings of (N−1) additions and subtractions.

Using a torque balance or kinetic energy formulation for cylinder torque is disclosed in the prior art in a number of patents (see, for example, U.S. Pat. Nos. 6,029,109 and 6,302,083). In these other patents, however, the same formulation is used as the primary means of calculating both the quasi steady and alternating components of cylinder torque. The method of the present invention is novel in that it employs the torque balance/kinetic energy to calculate only the alternating torque component. The quasi steady component is determined from the various measured engine quantities shown in FIG. 2, appropriately time delayed or filtered, to produce an accurate estimate of cycle averaged engine torque using steady state mapping data. This is beneficial because it requires knowledge of only a single physical constant (engine inertia), and no further parameterization of the engine or model is required.

The use of steady-state engine mapping data in determining the quasi steady component of engine torque also has been disclosed in the prior art in at least one other patent (U.S. Pat. No. 6,223,120) and in SAE paper 2001-01-0990, but this prior art method solves for torque in the frequency domain, not the time domain. Thus, knowledge of the time the events occurred is lost and the result cannot be easily combined as a metric for use in control or to assess accuracy in real time. The level of computational effort required for this prior art method may also not yet facilitate real time computation in today's microprocessors. SAE paper 2001-01-0990 indicates only a "near real time implementation".

Figure 3:
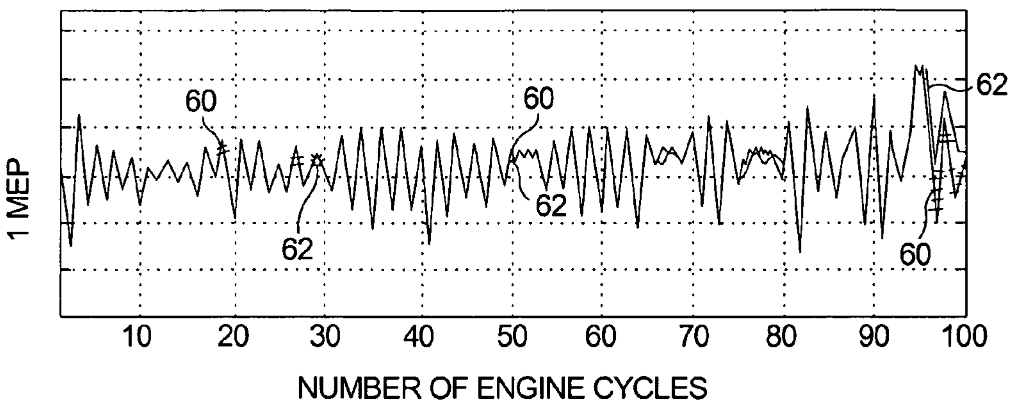
FIG. 3 is a graph for a typical cylinder of a multiple-cylinder engine showing measured indicated IMEP values as a function of engine cycle number, compared to the indicated IMEP values predicted in accordance with the present invention.
Figure 4:
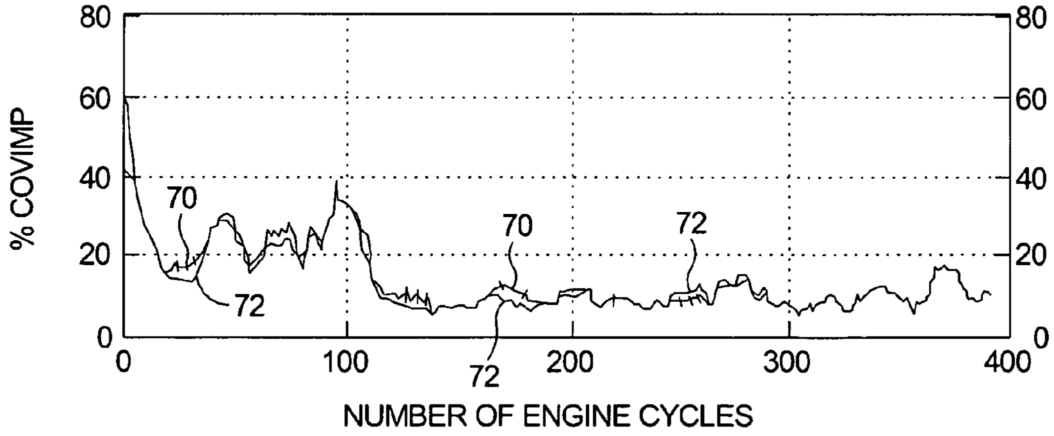
FIG. 4 is a graph for a typical cylinder of a multiple-cylinder engine showing percent COVIMEP as a function of engine cycle number, compared to the COVIMEP percentage predicted in accordance with the present invention.

Accuracy of estimating IMEP and COVIMEP in accordance with the present invention is shown in FIGS. 3 and 4, respectively.

Referring to FIG. 3, the Y axis is indicated engine IMEP value (in normalized units of pressure). The X axis is the number of engine operating cycles in the test. Curve 60 is the model's predicted IMEP values for an individual cylinder. Curve 62 represents measured values of IMEP for the same cylinder. It is seen that the estimation of IMEP provided by the estimator shown in FIG. 2 and in accordance with the present invention is highly accurate.

Referring to FIG. 4, the X axis is engine cycle number and the Y axis is COVIMEP in %. For an engine to be idling well (good NVH), the COVIMEP should be about 3% to 4%, or less. In this example, idle combustion is intentionally poor (by running very lean) to see how good the prediction is under worst case conditions. Again the predicted curve 70 is shown compared to the actual/measured values curve 72. A transient in engine speed (600 to 1000 rpm step) was imposed at about 100 cycles. This transient was calibrated into the test to see how good the prediction was under transient conditions similar to what a customer would see if he abruptly opened the throttle, or if the engine load changed due, for example, to the AC compressor turning off or on. Again, it is seen that the estimation of IMEP provided by the estimator shown in FIG. 2 is highly accurate.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for inferring Indicated Mean Effective Pressure as total transient indicated engine torque in an internal combustion engine, comprising the steps of:

a) acquiring at least one crankshaft time stamp for use in determining a cylinder-specific engine velocity;

b) calculating an incremental change in engine kinetic energy from the previously fired cylinder ($j-1^{st}$) to the currently fired ($j^{th}$) cylinder using said cylinder-specific engine velocity;

c) equating said incremental change in engine kinetic energy to a change in energy-averaged cylinder torque (IMEP) from the previously-fired ($j-1^{st}$) to a currently-fired ($j^{th}$) cylinder;

d) summing a plurality of said incremental changes in engine kinetic energy over time to determine a value of the transient component of indicated torque;

e) determining a value of quasi-steady indicated engine torque; and f) adding said value of the transient component of indicated torque to said value of quasi-steady indicated engine torque to yield said Indicated Mean Effective Pressure.

2. A method in accordance with claim 1 wherein said one acquired crankshaft time stamp is per a cylinder reference event period in determination of average engine velocity, engine acceleration, and corresponding incremental cylinder-by-cylinder changes in engine kinetic energy and average cylinder torque (IMEP) values.

3. A method in accordance with claim 2 wherein two crankshaft time stamps are acquired per cylinder reference event period.

4. A method in accordance with claim 1 wherein a quasi-steady indicated engine torque model is a component of a state-space algorithm for use in estimating cylinder indicated torque (IMEP) values.

5. A method in accordance with claim 1 wherein Coefficient of Variance of a plurality of said IMEP estimates is calculated for individual engine cylinders and for said engine as a whole.

6. A method in accordance with claim 5 wherein said IMEP estimates are used as a metric for control of combustion quality.

7. A method in accordance with claim 5, wherein said Coefficient of Variance is defined as $COV=\sigma/\bar{x}$ where $\sigma$ is the standard deviation and is equal to the square root of the sum of the square of the difference between the mean and the individual IMEP estimates $$\sigma = \sqrt{\sum_{1}^{N} (\bar{x} - x_i)^2 / (N - 1)}$$

and wherein calculation of said Coefficient of Variance includes the following steps:

a) storing individual sequential samples of said IMEP estimates in a buffer;

b) tracking the sum of the square and square of the average of said buffered IMEP values;

c) substituting $$\left(\bar{x} = \sum_{1}^{N} x_i / N\right)$$

for the mean value in $$\sigma = \sqrt{\sum_{1}^{N} (\bar{x} - x_i)^2 / (N - 1)}$$

such that $$COV = \sigma / \bar{x} = \sqrt{\left(\sum_{1}^{N} x_i^2 / \bar{x}^2 - N\right) \Big/ (N - 1)}\,; \text{ and}$$

d) for each calculation of Coefficient of Variance, adding the newest value to said buffered IMEP values and subtracting the oldest value from said buffered IMEP values.

8. A method in accordance with claim 1 wherein said method may be performed in real time during operation of said internal combustion engine.

9. An internal combustion engine controlled by an engine control algorithm including a method for inferring Indicated Mean Effective Pressure as total transient indicated engine torque, wherein said method includes the steps of:

acquiring at least one crankshaft time stamp for use in determining a cylinder-specific engine velocity, calculating an incremental change in engine kinetic energy from the previously fired cylinder ($j-1^{st}$) to the currently fired ($j^{th}$) cylinder using said cylinder-specific engine velocity, equating said incremental change in engine kinetic energy to a change in energy-averaged cylinder torque (IMEP) from the previously-fired ($j-1^{st}$) to a currently-fired ($j^{th}$) cylinder, summing a plurality of said incremental changes in engine kinetic energy over time to determine a value of the transient component of indicated torque, determining a value of quasi-steady indicated engine torque, and adding said value of the transient component of indicated torque to said value of quasi-steady indicated engine torque to yield said Indicated Mean Effective Pressure.

10. An engine in accordance with claim 9 wherein said engine is selected from the group consisting of spark-ignited and compression-ignited.

* * * * *